United States Patent Office 3,279,181
Patented Oct. 18, 1966

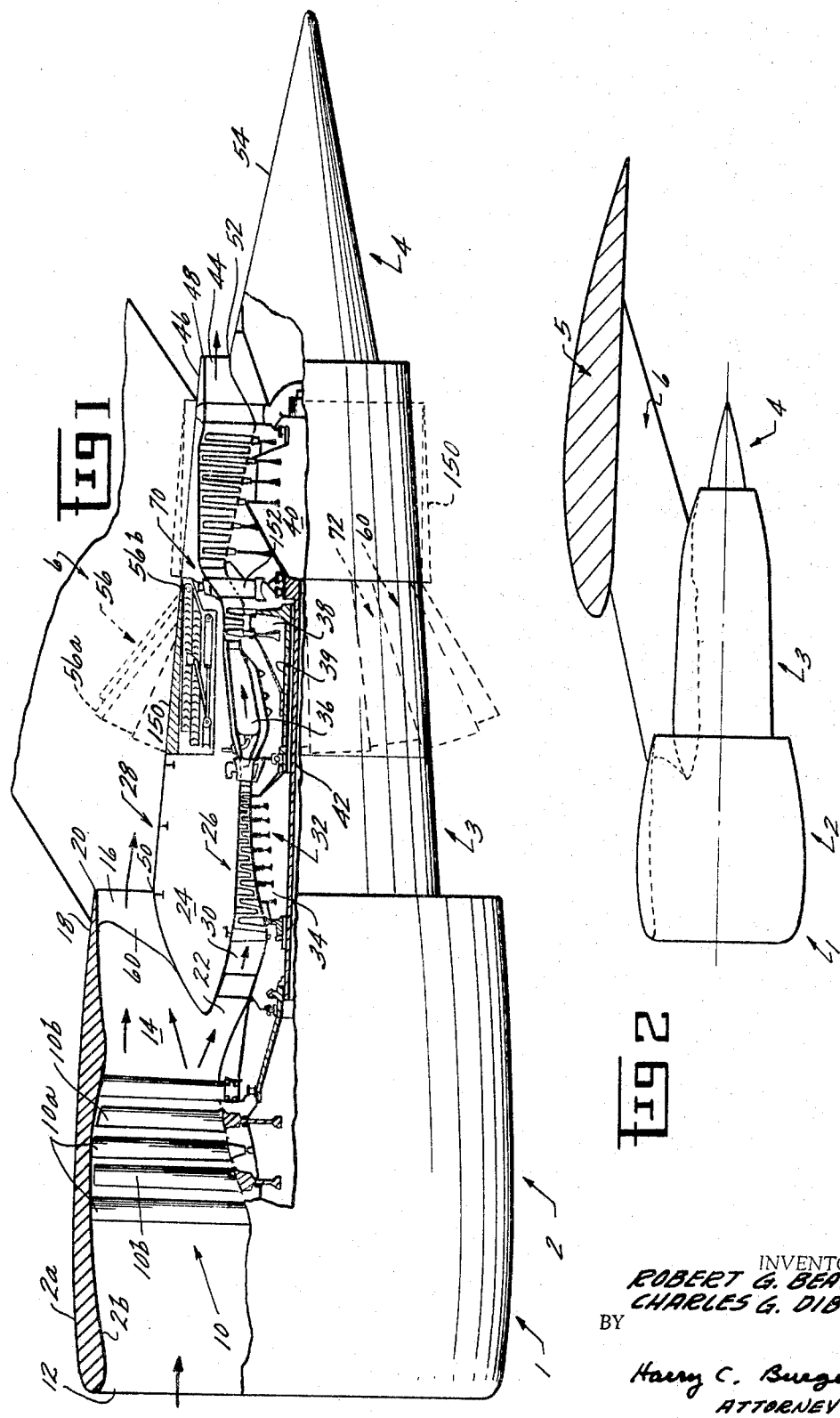

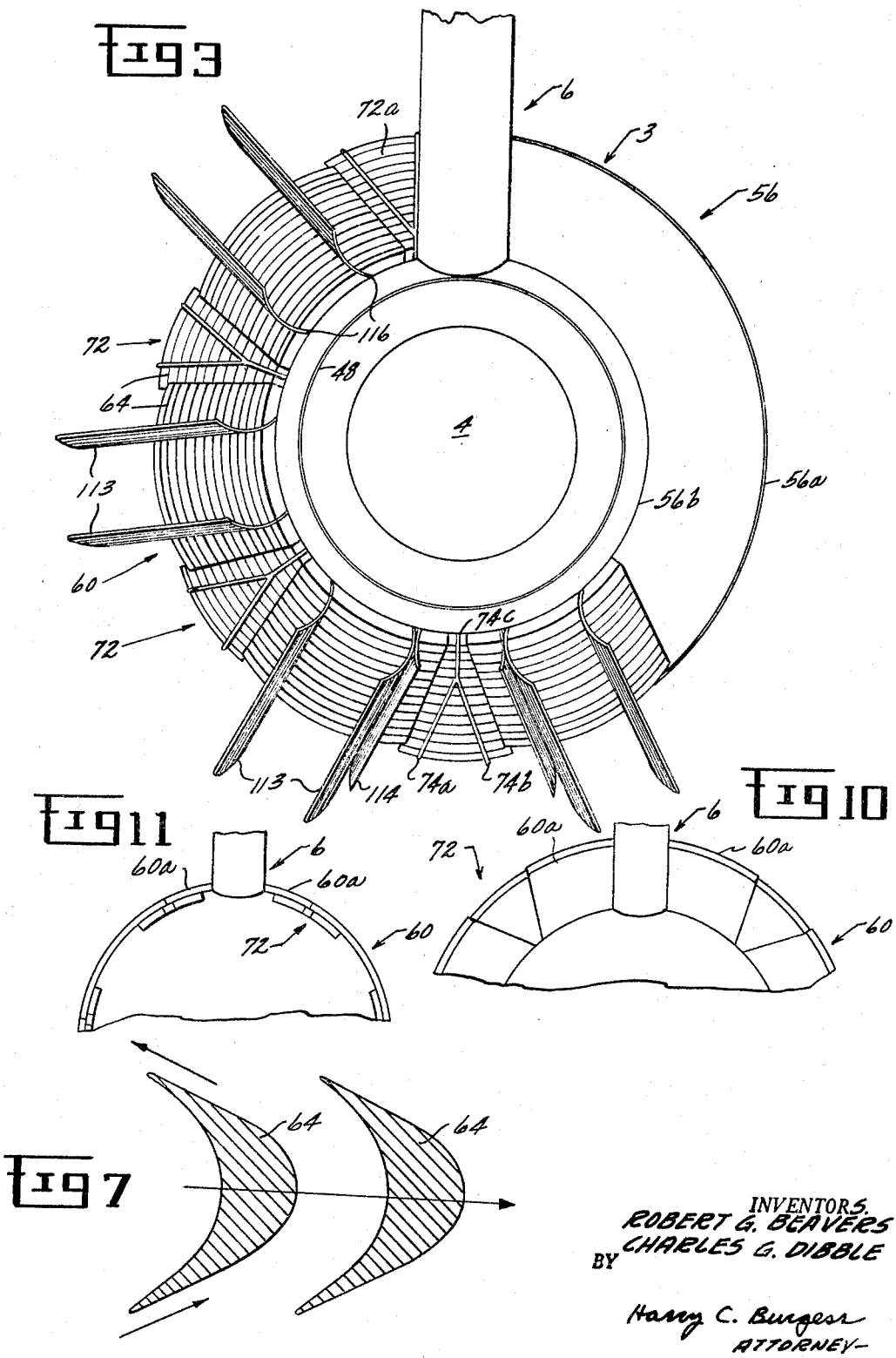

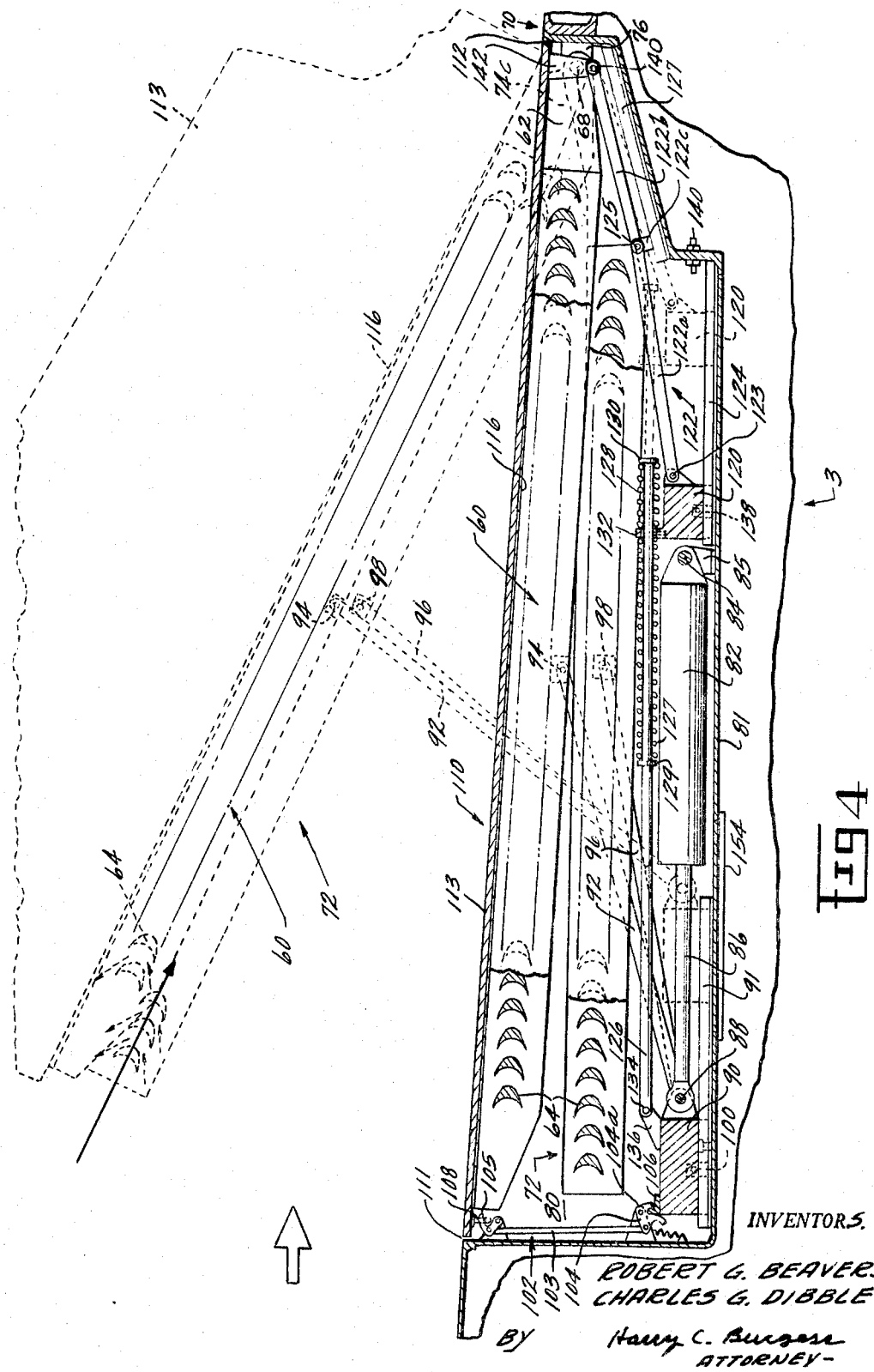

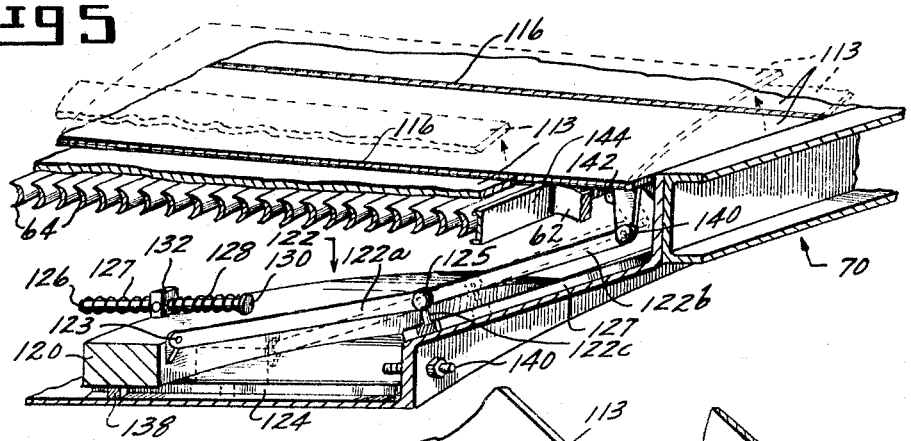
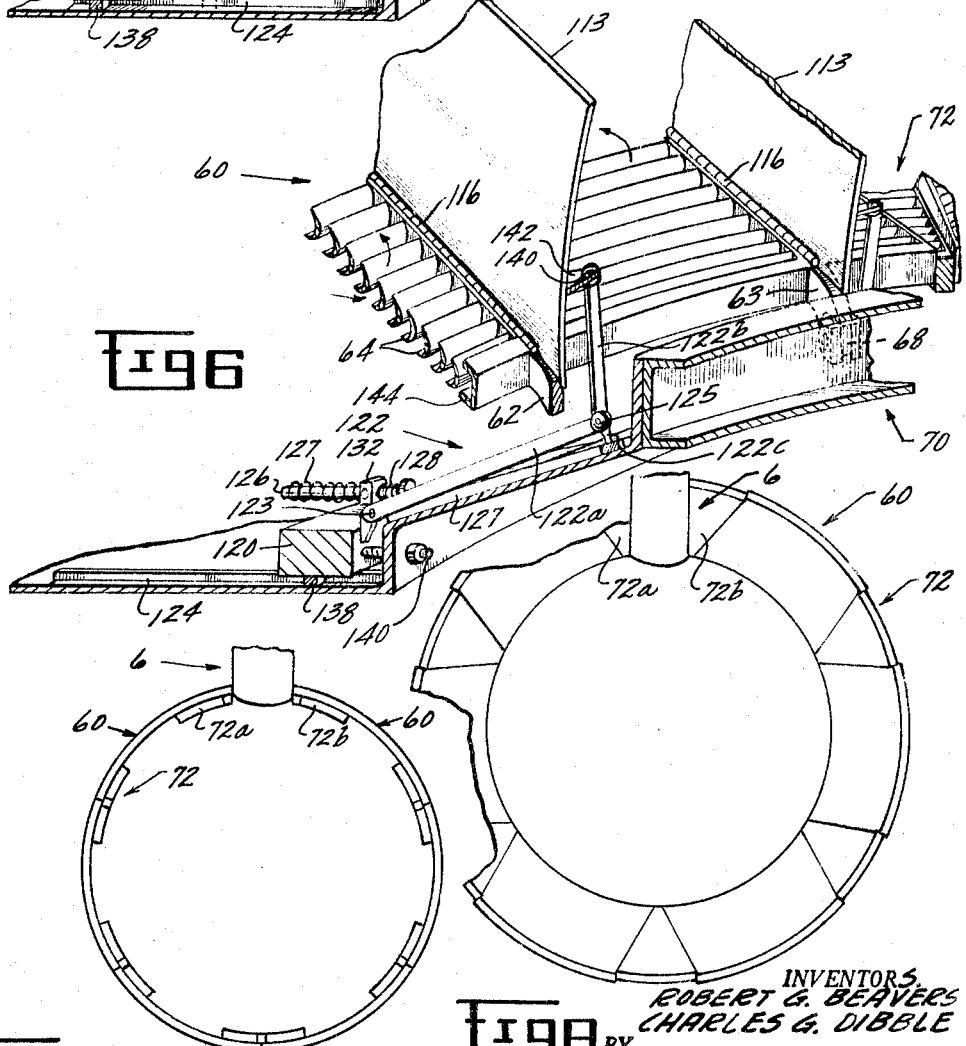

3,279,181
EXHAUST FLOW TURNING MEANS FOR TURBOFAN TYPE ENGINES
Robert G. Beavers, Mason, and Charles G. Dibble, Cincinnati, Ohio, assignors to General Electric Company, a corporation of New York
Filed July 1, 1964, Ser. No. 379,647
8 Claims. (Cl. 60—226)

This invention relates primarily to improved means for turning or substantially reversing the normally rearwardly directed flow of a propulsive gas stream of a turbofan type aircraft engine, and more particularly, to means for thrust reversal of the fan exhaust portion only of a turbofan aircraft engine having, in addition to the relatively cool propulsive gas stream of the fan, means for generating and discharging through a second exhaust nozzle a relatively hot propulsive gas stream.

Conventional axial-flow turbofan engines comprise generally two types, one being an arrangement wherein, in addition to the well known basic gas generator (e.g., a turbojet engine), there is a fan or lower pressure ratio compressor in a second passage formed by a duct concentrically arranged about the gas generator. The fan is driven either by the gas generator turbine by gearing or directly through use of a single shaft (in the case of the typical dual spool or single spool front fan), or driven aerodynamically (in the aft fan), i.e., not coupled mechanically to the gas generator. The fan duct or passage housing usually extends the entire length of the engine, in the front-fan variety, although the duct or cowling may terminate short of the gas generator exit plane. In the latter case, it may be desirable and permissible to reverse the fan flow only to bring about a slowing of the aircraft during the landing procedure.

Several means have been suggested for use in reversing the fan stream only. However, these known devices have proved to be less than completely satisfactory in their simplicity of operation, dependence on location immediately adjacent the fan duct opening and integration therewith, and in the design of the flow turning members themselves. For example, in order to obtain sufficient thrust reversal force in the case where the primary or hot gas generator stream is not itself reversed, reliance must be placed on mechanisms completely blocking the fan exhaust duct. This results in larger diameter, heavier and more cumbersome mechanisms which must conform to fan duct dimensional and locational requirements, further complicating the designer's task. It would be advantageous therefore, to provide a thrust reversal unit located in a position completely independent from, i.e., substantially axially downstream of, the fan exhaust opening such that its size, configuration, structural and operational features need not be compromised by the size or shape of the fan duct discharge opening or the cowling configuration.

Accordingly, an object of the present invention is an improved turbofan type aircraft engine apparatus for substantially reversing the normally rearwardly directed propulsive gas stream of the fan only.

A more specific object of the present invention is to provide an improved thrust reverser assembly adapted to be located substantially downstream of the fan discharge area of a turbofan type aircraft engine wherein the thrust reverser itself is movable in and out of a flow turning position with respect to the fan stream using a simplified actuation mechanism and wherein the actual means operable to turn the flow is designed to minimize actuation forces and maximize flow reversal.

It is another and more specific object of the invention to take advantage of means for directing the flow of the fan stream along the nacelle or casing of the gas generator portion of a turbofan type aircraft engine so as to minimize the diameter or physical dimension of the thrust reverser in the thrust reversing position and to facilitate its location as part of the aircraft/engine auxiliary components.

Briefly stated, in a disclosed embodiment we provide, for use in a turbofan type aircraft engine including a cowl defining an opening for the discharge of a relatively cool high volume low pressure propulsive gas stream directed along the outer wall of a hollow annular pod partially telescoped by the cowl and containing a gas generator having a second discharge opening for a relatively hot gas stream, means for substantially reversing the flow of the cool, or fan stream only comprising a plurality of circumferentially-disposed, generally axially-extending cascade assemblies, the assemblies including an array of circumferentially-extending impulse-type flow turning vanes and forming a generally continuous frusto-conical member in the thrust reversing position having its smaller diameter end rearwardly located and affixed to the pod and its larger diameter end located generally concentrically of the pod and substantially downstream of the cowl opening and substantially upstream of the rearwardly-directed pod opening. The frusto-conical member turns the flow along the surface outer wall through an angle greater than 90° with respect to the engine axis in the thrust reversing position and means are provided, open to the outer wall surface to receive the cascade assemblies for stowage out of the path of the fan stream in the forward thrust position. Covering means generally axially movable relative to the cowl opening plane and with respect to the cascades to uncover the latter for movement to the reverse thrust position and to close the opening in the outer wall surface in sealing engagement therewith—whenever the cascade assemblies are in the forward thrust or inoperative position—are also provided together with actuation means for moving the cascade assemblies and the covering means with respect thereto between the forward and reverse thrust positions. Finally, means are included to lock the cascade assemblies in either the forward or the reverse thrust position.

Other objects and features and attendant advantages of my invention will perhaps become more apparent by reference to the following detailed description and to drawings illustrating several embodiments thereof, wherein:

FIG. 1 is a side view, partially in cross-section and broken away, illustrating a turbofan type aircraft engine utilizing the thrust reversing or fan flow turning means of our invention;

FIG. 2 is a schematic illustration of the engine and nacelle (pod) as supported from an aircraft.

FIG. 3 is a view along the axis of the turbofan engine looking forwardly or upstream of the flow direction depicted in FIG. 1 and illustrating the thrust reverser means in the extended or flow turning position.

FIG. 4 is an enlarged partial, sectional view through the annular gas generator pod illustrating the thrust reverser receptacle, the stowage arrangement, and the simplified actuation system for the enclosure means and reverser vane assemblies of one embodiment in the stowed (solid line) and extended (dotted line) positions;

FIGS. 5 and 6 are pictorial views further illustrating the unique actuation means and cascade assembly configuration of my invention, with latter in the contracted and extended positions, respectively;

FIG. 7 is an enlarged sectional view of a pair of impulse-type vane flow-turning means of our improved thrust reverser means, indicating the direction of the propulsive gas stream flow entering and leaving the cascade array and the direction of the overall lines of force imposed on the assembly axis during reverse thrust operation;

FIGS. 8 and 9 are schematic drawings of a general overall axial view of the frusto-conical member formed by the vane assemblies in the reverse thrust position, and the superimposed relationship of the primary and secondary assemblies in the stowed or forward thrust position; and FIGS. 10 and 11 illustrate an embodiment of the arrangement of FIGS. 8 and 9 wherein the location of the engine supporting pylon or strut relative to the primary and secondary assemblies is changed.

Turning now more specifically to FIGS. 1 and 2, indicated generally therein by numeral 1 is an aircraft gas turbine engine. The engine includes a relatively short (in the axial direction) cowl member, a hollow annular nacelle or gas generator pod partially telescoped thereby, with the pod, in turn, partially enclosing a generally conical plug member, each being generally indicated at 2, 3 and 4, respectively. Each of the aforementioned structures are generally concentric about a plane through the engine axis and are supported from the aircraft fuselage or wing 5 by a pylon or strut 6. The engine as seen more clearly in FIG. 1, is of the axial-flow turbofan variety having a forward located axial-flow compressor or "fan" indicated generally at 10, adapted to receive air through the engine inlet 12. The fan is operable to generate a relatively high-volume, low-pressure gas stream in a passage 14. The axial-flow compressor 10 includes a series of alternately spaced stator vanes 10a and rotor blades 10b which may be of conventional airfoil design. The fan, therefore, will not be described further. The fan gas stream in passage 14 is diverted rearwardly for the greatest part through an opening 16 defined by an aft, inwardly-convergent portion 18 of cowl 2 terminating in a lip 20. Another portion of the fan stream is directed through an inlet 22 in the hollow annular pod or nacelle 3, the fan exhaust jet stream being split by a forward body portion of the pod, indicated generally at 24. Indicated generally at 26 and 28 are radially spaced inner and outer pod walls, respectively, the inner pod wall forming a passage 30 in which is disposed a gas generator 32 of the axial-flow variety. Gas generator 32 includes a compressor 34, a combustor 36 and a turbine 38 drivingly coupled to compressor 34, in a known manner by a shaft 39. At the aft end of passage 30 is a multi-stage turbine 40 coupled by a shaft 42, coaxial with the outer shaft 39, operable to drive the fan 10 by extraction of power from the hot gas stream existing from the turbine section 38 of gas generator 32. After passing through the turbine 40, the hot gas stream exits the turbofan engine through a second propulsive exhaust gas opening 44. Opening 44 is defined by a convergent aft portion 46 of the hollow annular gas generator nacelle or pod 3 terminating in a second lip 48.

As seen in the drawings, the hollow annular pod or fan afterbody 3 is symmetrical about a plane through the axis fo the turbofan engine 1. The outer wall 28 is generally coaxial with the convergent aft portion 18 of cowl member 2 and has a point of maximum diameter at 50 located in the plane of the lip 20. Point 50 and the lip cooperate to form a throat in the discharge opening or exhaust nozzle for the subsonic, relatively low-pressure, high-volume fan gas stream, the throat at all times in the plane of the opening 16. Furthermore, the outer member or the cowl defining the opening has an optimized low boattail or minimum drag configuration, i.e., it is an inwardly curved (or conical) surface with respect to the engine axis. In the dual "ABN" low drag turbofan engine nozzle and nacelle embodiment, described and shown above in FIG. 1, the relatively hot gas generator exhaust jet exits from the second engine exhaust nozzle having a throat at 48 formed by a point of maximum diameter 52 of plug member 4. The latter is generally conical and thus converges downstream of point 52 inwardly with respect to the engine axis for maximum pressure recovery along the outer surface 54 of the plug. Outer surface 28 and 54 thus form two turbofan engine recompression surfaces in the dual "ABN" configuration, as this nacelle and exhaust nozzle configuration has been called.

Turning now to a primary feature of our invention, as shown in dotted lines in FIG. 1, and in the axial view of FIG. 3, the flow turning or thrust reversing means in the operating position forms a generally continuous frusto-conical member indicated generally at 56. The member 56 is so arranged that the apex (which would otherwise be at the engine axis) of the frustrum of the "cone" points downstream so that the larger diameter end, indicated at 56a, is located upstream or forwardly of the rearward or smaller diameter end, indicated at 56b, which, in effect, closely surrounds the slightly convergent outer wall surface 28 of the pod 3. Note, in particular, that edge 56a is substantially downstream of opening 16. In FIG. 1, the thrust reverser assemblies which go to make up the frusto-conical member 56 are shown stowed or inoperative (solid lines) in the upper cut-away portion of the drawing, and in position to form the frusto-conical member (dotted lines) in the lower half of the figure. The structure of the frusto-conical member will now be described in detail.

As seen in the drawings, there is a first plurality of generally rectangular shaped cascade assemblies, some of which are indicated generally at 60 in FIG. 3. Each primary or main cascade assembly 60, of which there are six in the disclosed embodiment, includes at least two parallel beam members 62–63 circumferentially spaced and pierced by a series or array of turning vanes 64. The turning vanes are arcuate or curved sections generally concentric along their longitudinal axes (chordal centers) to the engine axis. Thus, the vane array or cascade as a whole is curved and will fit around the pod when stowed, as hereinafter described in more detail. The beams 62–63 include hinge means 68 at their aft ends for pivotally attaching the cascades to the engine (pod) supporting structure indicated generally at 70. A second plurality of cascade assemblies 72 are also provided which, as will be noted particularly in FIGS. 3, 4 and 6, are triangular in shape to fill in the spaces between the adjacent rectangular assemblies 60, when the assemblies are in the extended or thrust reversing position to form member 56. The smaller, triangular shaped cascades 72 comprise a forked-shaped beam member 74 having two forward divergent arms 74a and 74b and a rearward hinge-supporting beam portion 74c. Hinge means 76 are also provided about which the triangular members can pivot between the forward and reverse thrust positions. In the embodiment of FIGS. 3, 8 and 9 the relative location of the triangular and rectangular-shaped cascade assemblies with respect to the pylon is such that two mirror-image triangular-shaped assemblies 72a and 72b are conformed to fit closely about the pylon in the reverse thrust position. On the other hand, if desired, the cascade assemblies may be "rotated" i.e., relatively located circumferentially with respect to the pylon such that, as shown in FIGS. 10 and 11, the pylon pierces a rectangular-shaped cascade assembly 60a, rather than being between the two mirror-image triangular assemblies, a somewhat more simplified arrangement. In either event, as shown schematically in FIGS. 8–11, is the open or operative position the thrust-reverser cascade assemblies form the generally continuous, frusto-conical member 56, wherein the smaller cascades are mounted slightly ahead of the larger cascades and are slightly wider than the gaps covered to insure maximum interception of the fan gas stream. In the stowed position, the assemblies are "nested," i.e., the primary or rectangular assemblies 60 form a substantially cylindrical member containing the inwardly located triangular shaped cascade members 72. This novel arrangement, seen in greater detail in FIGS. 1 and 4, facilitate stowage and reduces the radial height (space) needed to receive the thrust reverser mechanism.

Turning now more specifically to another feature of our invention, as shown in FIGS. 4–6, there is provided a simplified actuation mechanism for the cascade assemblies and enclosure means, are hereinafter described. Mounted in a receptacle, indicated generally at 80, the receptacle being open to the outer surface 28 of the pod and having a bottom wall 81, is at least one motor means or actuator 82 of the well known hydraulic, pneumatic or electrical variety. The motor means is rigidly attached at 84 to a clevis 85 affixed to the bottom wall of the receptacle 81. An actuator rod 86 extends forwardly to connect, at 88, to a first unison ring 90. Ring 90 is slidably supported in a track 91 for fore and aft translation generally parallel to the axis of the engine on operation of the motor means. A first plurality of link members are provided, one of which is shown at 92, pivotally attached at one end to point 88, the other end of the link being pivotally connected to a primary cascade assembly 60 at 94. A second plurality of link members is also provided, one of which is indicated at 96, each having its one end also attached at 88, the other end of this second link member being pivotally connected to a triangular-shaped or secondary cascade assembly 72 at 98. The link members 96 for the triangular-shaped assemblies are preferably N-shaped since the latter have only one pivot point or hinge means 76—at the end of the forked beam 74—and thus require a three-point support arrangement for greater stability. As shown in solid lines in FIG. 4 and FIG. 9 when retracted, the first and second pluralities of cascade assemblies and associated linkage therefore fit quite compactly in receptacle 80. Means to lock the assemblies and actuation means in this position are also provided including a ball-stop or catch 100 in the ring 90 and a positive latching mechanism indicated generally at 102. The latter comprises a clevis-mounted pivotal connecting rod 103 having a pair of catch or hook means 104–105 at opposite ends thereof. Hook means 104 pivots on rod 103 and has a dog 104a or trigger adapted to contact a trip-bracket 106 affixed to the ring 90 to retain the latter in the forward or thrust reverser inoperative position, as shown in FIG. 4. Pivotable hook means 105, on the other hand, is adapted to engage a U-bolt or ring 108 affixed to the underside of the cascade cover or enclosure means, indicated generally at 110. Sealing means may also be provided at 111 and 112 to present a substantially air-tight compartment 80 under forward thrust operating conditions.

As will be seen in FIGS. 3–6, one form of the cascade covering or enclosure means comprises a plurality of circular section members indicated generally at 113 and 114. The members 113 are adapted to cover certain of both the first and second plurality of cascade assemblies, except as pointed out below, and are therefore generally rectangular in plan view and are twelve in number, as seen more clearly in FIG. 3. Cover members 113 are pivotally mounted on beams 62–63 by a piano-type hinge 116. Cover members 114 are likewise utilized to enclose the triangular shaped cascade assembly 72 which, in the embodiments of FIGS. 7 and 8, is located 180° from the strut location. These latter covers are of less width than covers 113, pivot oppositely to the covers 113 adjacent thereto, and are in abutment therewith to seal over the lower (in the drawing) secondary cascade assembly 72, as well as a small portion of the adjacent rectangular assemblies 60. Note that in the embodiment of FIGS. 10–11, since the strut or pylon 6 intersects a rectangular cascade assembly 60a, there would be no requirement for the immediately above described arrangement, since opposite the strut location, i.e., 180° of the frusto-conical member 56, will be a rectangular cascade. In any event, the covers and the rectangular or triangular cascade assemblies are conformed to the outer shape of the strut fairing.

Referring again to the FIG. 4 embodiment, it will be noticed that there is provided a second unison ring 120 and a linkage, indicated generally at 122, for moving the enclosure means or covers between the forward and reverse thrust. With the following arrangement the covers may be opened, or closed with the cascade assemblies in any position, a feature which may be utilized to provide thrust modulation, during flight, if desired. Thus, unison ring 120 is translated on track 124 by being operably connected to motor means 82 by an interconnecting member or rod 126 having a concentric double spring arrangement consisting of a long spring 127 and a shorter spring 128 held in place on rod 126 by stops 129 and 130, together with a ball-catch 132. Ball-catch 132 is firmly affixed to unison ring 120 and slidably supports rod 126 adjacent the downstream end thereof, the upstream end being pivotally attached at 134 by a clevis 136 affixed to the first unison ring 90. In operation, during approximately the first 60% of the total travel of actuator rod 86 rearwardly, the first unison ring 90, ball-catch 132 and rod 126 effectuate parallel movement of the second unison ring 120, since the retaining force of ball-catch 138—which aids in holding the latter ring in place—and the resiliency of spring 127 is overcome by the actuator force. At this point the enclosure means 113–114 will be fully opened, in this embodiment, with the cascades but partially open. Then spring 127 being sufficiently compressed disengages ball-catch 132 and the rod 126 continues to move rearwardly and relative to ring 120 which will then be up against an adjustable stop 140—until the cascades are fully open and in position to form the frusto-conical member 56. Coil spring 127 will then hold the second ring firmly against the adjustable stop 140, as perhaps best seen in FIG. 6. The latter figure also depicts more clearly that the door linkage 122 includes a first arm 122a pivotally attached at 123 to ring 120 and a second arm 122b pivotally attached to the other end of arm 122a at 125. Arm 122a includes a short leg 122c which rides in a track 129 to guide and support the door linkage. The other end of arm 122b is pivotally engaged at 140 with a bracket 142 affixed to the underside of the cover 113 in a manner so as to clear a reinforcing beam 144, which may be provided to strengthen the cascade assembly. Also, when in the stowed position, ball-catch 132, spring 127 and ball-catch 100 all operate to maintain the cascades therein to assure forward thrust operation in the event of hydraulic, pneumatic or electrical failure.

Still another important feature of the subject invention is the provision for fail-safe operation of the cascade assemblies, e.g., in the forward thrust, as shown in FIGS. 4 and 6. This is accomplished primarily by locating the pivot point 68 for the cascades with respect to the lines of force through the cascades such that an overturning moment in the closing direction—in this instance—is provided. As seen in FIG. 4 the forked beam end 74c is bent or curved outwardly and this, combined with use of impulse type curvature in the vanes or blades 64, insures a line of force along the longitudinal axes of the secondary cascade assemblies as shown by the small solid arrow in FIGS. 4 and 7 at the forward end of the triangular-shaped assembly. Since the lines of force along the axes of the primary cascades are neutral, e.g., pass through the center of pivot point 68, this will be enough to collapse the frusto-conical member 56, if power fails. The arrangement could be reversed, if it were desirable to cause the reverser to fail "open" or in the reverse thrust position.

If desired the enclosure means 113–114 could be operated independently by installing a second one (or more) motor means, in addition to that shown in FIG. 4 at 82. On the other hand, as shown in FIG. 1, a single cylindrical cover member 150 could be utilized as an alternate to the covers 113–114. This would further simplify the actuation means by eliminating the need for the second ring 120 and linkage 122, since movement of the enclosure member 150 could be accomplished using the cascade assembly actuation system. Also, the need for sealing means would be considerably reduced since member 150 would present an essentially aerodynamically smooth surface.

It should be pointed out that, as shown in FIG. 7, the vanes used to turn the flow being of the impulse-type reduces complexity and weight since no sealing is required between the reverser segment. Also, by location of the pivot point 68 at the main aft engine mount 152 the structural weight of the mechanism is further minimized. Finally, location of the member 56 well aft of the fan exhaust nozzle opening provides space for additional aircraft/engine auxiliaries in space 24, as well as access door 154 in the bottom wall 81 of the receptacle to permit easy inspection of the hot parts gas generator 32.

While there have been described preferred forms of the invention, obvious modifications and variations are possible in light of the above teachings. It is therefore to be understood that within the scope of the appended claims, the invention may be practiced otherwise than as specifically described.

What is claimed as new and desired to be secured in the United States Patent Office is:

1. In an axial-flow turbofan type aircraft engine having at least one compressor and one aerodynamic boattail nozzle exhaust system for the discharge of a relatively high volume, low pressure propulsive gas stream from said compressor, an aircraft/engine auxiliary comprising means for substantially reversing the direction of said stream including:
   a first plurality of generally rectangular-shaped lightweight cascade assemblies, each assembly comprising at least two circumferentially-spaced axially-extending beams, a series of axially-spaced impulse type turing vanes rigidly joined to said beams and providing a first plurality of flow paths for said gas stream, and hinge means at the rearward ends of said beams;
   a second plurality of generally triangular-shaped lightweight cascade assemblies, each cascade of said second plurality including a forked beam the single end thereof being downstream with the divergent arms thereof facing upstream, a series of axially-spaced impulse type turning vanes rigidly joined to said forked beam and providing a second plurality of flow paths for said gas stream, and a single hinge means at said downstream beam end, said vanes of said first and second cascade assemblies each being an arcuate section generally concentric with said engine axis;
   a receptacle in said engine open to receive said cascade assemblies when in an inoperative or forward thrust position;
   enclosure means for said first and second cascade assemblies in said forward thrust position including at least one cylindrical section member, said member being movable relative to said assemblies and generally away from the exit plane of said gas stream to uncover said assemblies for reverse thrust operation, said enclosure means sealing said receptacle opening in the forward thrust position to present a smooth recompression surface for said gas stream;
   actuation means for moving said enclosure means and said cascade assemblies between said reverse thrust and said forward thrust positions;
   rearwardly located mounting means within said receptacle for pivotally supporting said cascade assemblies by said hinge means, the triangular-shaped cascade assemblies in said reverse thrust position being positioned intermediate of and in abutment with adjacent ones of said rectangular-shaped cascade assemblies to provide a generally continuous frusto-conical member having its greatest diameter forwardly located substantially downstream of the exit plane of the gas stream from said compressor, the impulse type vanes of said frusto-conical member turning said gas stream through an angle greater than 90° with respect to the engine axis;
   and means to lock said first and second cascade assemblies and said enclosure means in either the forward or the reverse thrust position.

2. In an axial-flow turbofan type engine including an aerodynamic boattail exhaust nozzle and nacelle arrangement comprising a generally cylindrical cowl member having a convergent aft portion defining a first discharge opening for a relatively high volume, low pressure propulsive gas stream, a pod member concentric in a plane through said engine axis and having an enlarged forward end portion telescoped by said cowl member to form a nozzle throat for said first gas stream and a rearward portion downstream of said nozzle throat inwardly convergent with respect to said engine axis to provide a recompression surface for said first gas stream, said pod member having radially spaced outer and inner walls defining an engine auxiliary chamber therebetween, said inner pod wall enclosing a gas generator and having a rear portion defining a second discharge opening for a propulsive gas stream from said gas generator, means for at least partially reversing the flow direction of said first gas stream along said recompression surface, said flow reversing means comprising:
   a plurality of circumferentially-disposed generally axially-extending cascade assemblies, said cascade assemblies including circumferentially extending turning vanes and being pivotally attached to the engine at their downstream ends for radially outward movement about said ends to form a generally continuous frusto-conical member having its larger diameter end forwardly located substantially downstream of said aerodynamic boattail exhaust nozzle throat and substantially upstream of said second discharge opening, said frusto-conical member turning the flow along said recompression surface through an angle gerater than 90° with respect to said engine axis in the thrust reverse position, said engine auxiliaries chamber being open through said turbofan engine recompression surface to receive said cascade assemblies for stowage out of the path of said first propulsive gas stream in the forward thrust position;
   covering means movable relative to the plane of said nozzle throat and said cascades to uncover said cascades for movement to said reverse thrust position and to close the opening in said recompression surface in sealing engagement therewith whenever said cascade assemblies are in the forward thrust or inoperative position;
   and actuation means disposed at least partially within said engine auxiliaries chamber for pivotally moving said cascade assemblies and relatively moving said covering means with respect thereto between said forward thrust and said reverse thrust positions.

3. In a turbofan type aircraft engine having at least one axial-flow compressor and one aerodynamic boattail exhaust nozzle system for the discharge of a relatively high volume, low pressure propulsive gas stream from said compressor, an aircraft/engine auxiliary comprising means for substantially reversing the direction of said stream including:
   a plurality of primary cascade assemblies;
   a plurality of secondary cascade assemblies, separate ones of said second plurality of cascades being located intermediate and in abutment with adjacent ones of said first plurality to provide a substantially continuous frusto-conical flow turning member having its larger diameter end located forwardly and substantially downstream of the exit plane of said gas stream from said compressor when in a reverse thrust position;
   enclosure means for said primary and secondary cascade assemblies in a forward thrust position including at least one cylindrical section member, said member being movable relative to said assemblies and generally away from said exit plane to uncover said assemblies for reverse thrust operation;

actuation means for pivotally moving said pluralities of cascade assemblies between said reverse thrust postion and said forward thrust position, said actuation means including
  (a) motor means,
  (b) a ring member concentric with said engine axis and operably connected to said motor means for translatory movement along said axis,
  (c) a first plurality of link members, one end of each link of said first plurality being pivotally attached to said ring, the other end being pivotally attached to individual ones of said first cascade plurality, and
  (d) a second plurality of link members, one end of each link of said second plurality being pivotally attached to said ring, the other end being pivotally attached to individual ones of said second cascade plurality;

means operable to move said cylindrical section enclosure means between a covering and an uncovering position in cooperation with movement of said cascade assembly pluralities from said forward thrust to said reverse thrust positions, respectively;

a receptacle integral with said aerodynamic boattail exhaust nozzle system and having a bottom wall portion, said receptacle being open to receive said primary and secondary cascade assemblies for stowage out of the path of said gas stream when in said forward thrust position, the cascade assemblies of said second plurality being located immediately inwardly and in an overlapped relationship with respect to the cascade assemblies of said primary plurality when so stowed, said receptacle opening being sealed by said enclosure means in said forward thrust position;

rearwardly located mounting means within said receptacle and attached to the smaller diameter end of said frusto-conical member and pivotally supporting said cascade assemblies for movement to said reverse thrust position, said mounting means being offset with respect to the forces imposed along the individual cascade axes of at least one of the said cascade pluralities in said reverse thrust position so as to cause a turning moment in the closing or forward thrust position direction in the event of failure of said actuation means;

and means to lock said primary and secondary cascade assemblies and said enclosure means in said forward thrust position.

4. In a turbofan type aircraft engine having at least one axial-flow compressor and one aerodynamic boattail exhaust nozzle system for the discharge of a relatively high volume, low pressure propulsive gas stream from said compressor, and aircraft/engine auxiliary comprising means for substantially reversing the direction of said stream including:

a first plurality of generally rectangular-shaped lightweight cascade assemblies, each assembly comprising a pair of circumferentially spaced axially-extending beams, a first array of impulse-type turning vanes rigidly supported by said beams in an axially-spaced relationship to provide a first plurality of flow paths for said gas stream, and hinge means at the rearward ends of said beams;

a second plurality of generally triangular-shaped lightweight cascade assemblies, each cascade of said second plurality including a forked beam the single end thereof being downstream with the divergent arms facing upstream, a second array of impulse type turning vanes rigidly supported by said forked beam in an axially-spaced relationship to provide a second plurality of flow paths for said gas stream, and a single hinge means at said downstream beam end, said vanes of said first and second cascade assemblies each being an arcuate section generally concentric with said engine axis;

enclosure means for said first and second cascade assemblies including at least one cylindrical section member, said member being movable relative to said assemblies and generally away from the exit plane of said propulsive gas stream to uncover said assemblies for reverse thrust operation;

a receptacle integral with said aerodynamic boattail nozzle and having a bottom wall portion, said receptacle being open to receive said first and second cascade assemblies for stowage out of the path of said gas stream when in the inoperative or forward thrust position;

rearwardly located mounting means for said hinge means within said receptacle for pivotally supporting said cascade assemblies, said triangular shaped cascade assemblies in said reverse thrust position being positioned intermediate of and in abutment with adjacent ones of said rectangular shaped cascade assemblies to provide a generally continuous frusto-conical member having its larger end forwardly located substantially downstream of the exit plane of the gas stream from said compressor, wherein said arrays of vanes turn said gas stream through an angle greater than 90° with respect to the engine axis, said triangular-shaped cascade assemblies in said forward thrust position being positioned adjacent said receptacle bottom wall portion with said rectangular shaped cascade assemblies being located immediately radially outward thereof, said rectangular-shaped assemblies being in abutment in said stowed position and forming a substantially continuous circular member within said receptacle;

and means to lock said first and second cascade assemblies and said enclosure means in the forward thrust position.

5. In an axial-flow, turbofan type aircraft engine including a dual aerodynamic boattail exhaust nozzle and nacelle arrangement comprising a generally cylindrical cowl member having a convergent aft portion defining a first discharge opening for a relatively high volume, low pressure propulsive gas stream, a pod member concentric in a plane through said engine axis and having an enlarged forward end portion telescoped by said cowl member to form a first aerodynamic boattail exhaust nozzle throat for said first gas stream and rearward portion downstream of said cowl opening inwardly convergent with respect to said engine axis to provide a first turbofan engine recompression surface for said first gas stream, said pod member having radially spaced outer and inner walls defining an engine auxiliaries chamber therebetween, said inner pod wall enclosing a gas generator and having an inwardly convergent rear portion defining a second discharge opening for a propulsive gas stream from said gas generator, and a generally conical plug member concentrically disposed in said second opening and being convergent downstream from a point of maximum diameter at said second opening to form a second aerodynamic boattail nozzle throat, said plug providing a second turbofan engine recompression surface for said gas generator stream, means for at least partially reversing the flow direction of said first gas stream along said first turbofan engine recompression surface, said flow reversing means comprising:

a plurality of primary cascade assemblies;

a plurality of secondary cascade assemblies, said primary and secondary cascade assemblies being pivotally attached to the engine at their downstream ends for radially outward movement about said ends to form a generally continuous frusto-conical member having its larger end forwardly located substantially downstream of said first aerodynamic boattail nozzle throat and its smaller end rearwardly located substantially upstream of said second aerodynamic boattail nozzle throat, said frusto-conical member turning the flow along said first engine recompression surface of said dual aerodynamic boattail exhaust nozzle and nacelle arrangement through an angle greater than 90° with respect to said engine axis in the thrust reverse position;

a receptacle integral with said pod rearward portion and having a bottom wall portion, said receptacle being open to said first recompression surface to receive said primary and secondary cascade assemblies for stowage out of the path of said first propulsive gas stream when in the inoperative or forward thrust position;

enclosure means for said primary and secondary cascade assemblies including at least one cylindrical section member, said member being movable relative to said assemblies and generally away from the exit plane of said cowl opening to uncover said assemblies for reverse thrust operation;

actuation means for moving said enclosure means and said pluralities of cascade assemblies between said reverse thrust and said forward thrust position, the cascade assemblies of said second plurality being located immediately inwardly and in an overlapped relationship with respect to the cascade assemblies of said primary plurality when stowed within said receptacle, said receptacle opening being sealed by said enclosure means in said forward thrust position;

rearwardly located mounting means within said receptacle supporting said cascade assemblies for said pivotal movement, said mounting means being offset with respect to the forces imposed along the individual cascade axes of at least one of the said cascade pluralities in the reverse thrust position so as to cause a turning moment in the closing or forward thrust position in the event of failure of said actuation means;

and means to lock said primary and secondary cascade assemblies and said enclosure means in said forward thrust position.

6. In a turbofan type aircraft engine including a cowl defining an opening for the discharge of a relatively cool high volume, low pressure propulsive gas stream, said cool gas stream being directed rearwardly along an outer wall surface of a hollow annular pod partially telescoped by said cowl and extending substantially downstream of said cowl opening, said pod enclosing a gas generator and having a rearwardly-directed opening for the discharge of a relatively hot propulsive gas stream, means for reversing the flow of said relatively cool stream along said outer wall surface, said flow reversing means comprising:

a plurality of circumferentially-disposed, generally axially-extending cascade assemblies, said cascade assemblies including an array of circumferentially-extending flow turning vanes, said assemblies forming a generally continuous frusto-conical member in the thrust reversing position having its smaller diameter end rearwardly located and affixed to the pod and its larger diameter end located generally concentrically of said pod and substantially downstream of said cowl opening and substantially upstream of said rearwardly directed pod opening, said frusto-conical member turning the flow along said surface outer wall through an angle greater than 90° with respect to said engine axis in said thrust reversing position;

means to open to said outer wall surface to receive said cascade assemblies for stowage out of the path of said relatively cool propulsive gas stream in the forward thrust position;

covering means generally axially movable relative to the cowl opening plane and with respect to said cascades for movement to said reverse thrust position and to close the opening in said outer wall surface in sealing engagement therewith whenever said cascade assemblies are in the forward thrust or inoperative position;

actuation means for pivotally moving said cascade assemblies and relatively moving said covering means with respect thereto between said forward thrust and said reverse thrust positions;

and means to lock said cascade assemblies in either said forward or said reverse thrust position.

7. The invention according to claim 6 wherein said covering means includes a substantially continuous cylindrical member concentric with said pod in a plane through the engine axis, said cylindrical member being mounted for translatory movement fore and aft generally parallel to said axis.

8. The invention according to claim 6 wherein said actuation means includes motor means, a ring member concentric to said axis and operably connected to said motor means for translatory movement fore and aft parallel to said axis, and a plurality of link members pivotally connected between said ring and said cascade assemblies and said cylindrical member, respectively, wherein initial operation of said motor means causes complete uncovering of said cascades and movement thereof to a partial flow turning position, followed by final operation of said motor means to complete movement of said cascades to the maximum flow turning position.

No references cited.

MARK NEWMAN, *Primary Examiner.*
SAMUEL FEINBERG, *Examiner.*